Inventor
RICHARD L. OWENS
By Paul & Paul
His Attorneys

UNITED STATES PATENT OFFICE.

RICHARD L. OWENS, OF MINNEAPOLIS, MINNESOTA.

GRAIN-FEEDING SPREADER.

1,422,297. Specification of Letters Patent. Patented July 11, 1922.

Application filed November 18, 1921. Serial No. 516,136.

*To all whom it may concern:*

Be it known that I, RICHARD L. OWENS, a citizen of the United States, resident of Minneapolis, in the county of Hennepin and State of Minnesota, have invented certain new and useful Improvements in Grain-Feeding Spreaders, of which the following is a specification.

This invention relates particularly to improvements in devices designed to be used particularly in feeding grain to grain separators, the object of the invention being to provide a simple device by which grain fed to one side of the machine can be evenly fed and distributed entirely across the machine; another object of the invention being to provide means for adjusting said spreader and thereby regulating the feed of the grain as may be desired.

The invention consists generally in the constructions and combinations hereinafter described and particularly pointed out in the claims.

Figure 1:
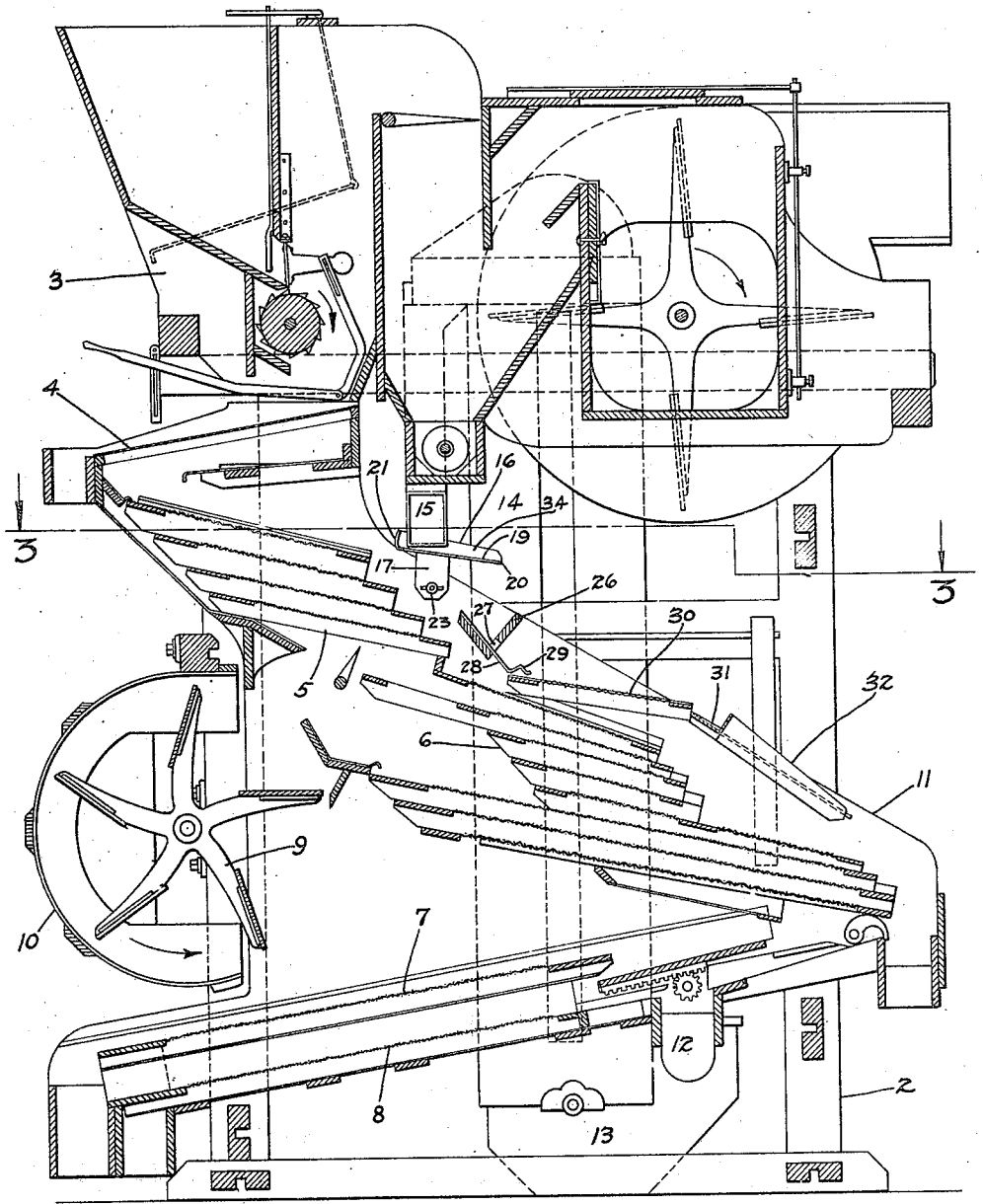
Figure 1 is a vertical section of a grain separator having my grain feeding spreader applied thereto.
Figure 2:
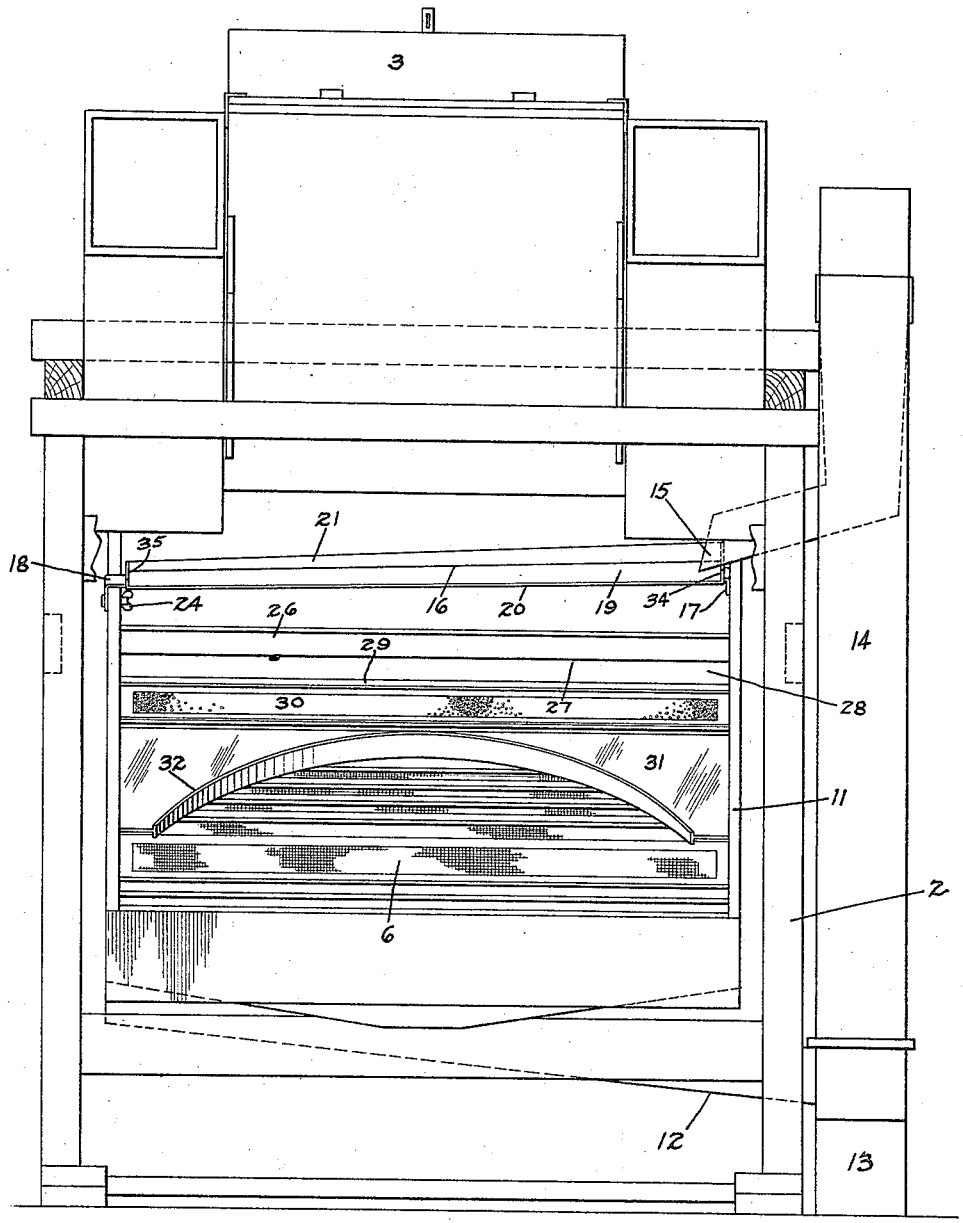
Figure 2 is a rear end elevation of the machine.
Figure 3:
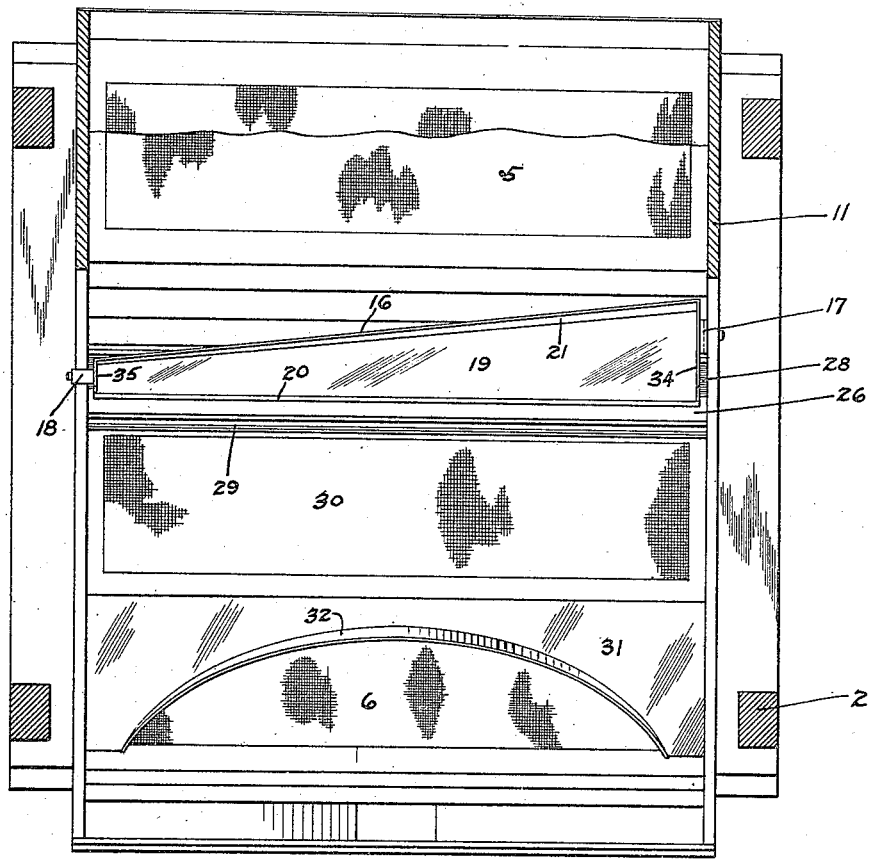
Figure 3 is a horizontal section on line 3—3 of Figure 1, looking in the direction of the arrows.

In the drawings, 2 represents the frame of a gain separator, 3 the grain feeding hopper and mechanism coacting therewith to deliver the grain to a suitable scalping sieve 4. 5 and 6 represent the main gang of sieves and 7 and 8 the oppositely inclined sieves arranged below said main gang. 9 is a fan and 10 a fan casing, these parts being employed to create a blast of air through and between the sieves hereinbefore referred to.

While the sieves may be arranged in different groups or gangs, each of which is mounted in a separate frame, or in a separate shoe, I have here shown all of the sieves hereinbefore referred to, supported upon a single shoe 11. This shoe is preferably supported by any suitable means so as to be capable of having an oscillatory movement imparted thereto in a manner understood by those familiar with this class of devices.

The machine herein illustrated and described is substantially that disclosed in my application for Letters Patent filed December 12th, 1917, Serial No. 206,783, and I make no claim herein to the general construction and arrangement of said machine.

In the machine of my said application and in other applications for patents filed by me in the United States Patent Office, I have disclosed means for dividing the material passing through the lower part of the lower sieve, and conducting a portion thereof to a repeat elevator, by means of which it is carried up and delivered to one of the upper sieves of the shoe, so that the material can be re-cleaned, or the cleaning action may be "repeated", as it is generally called. For this purpose I employ in connection with the lower or oppositely inclined screen frame a spout or conductor 12 leading into the elevator boot 13, whereby any grain deposited therein is carried up by the grain elevator 14 and dumped into a spout 15 by which it is discharged into one side of the machine at a point above the shoe 11, or above the spouts and conductors arranged thereon.

It is desirable that this repeat material returned to the sieves shall be fed in an even sheet extending entirely across the machine.

Figure 4:
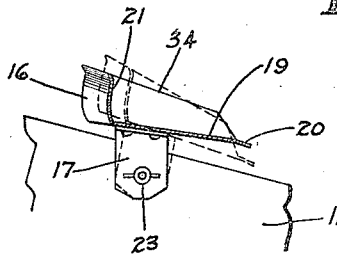
Figure 4 is a detail showing means for adjustably supporting one end of the spreader.
Figure 5:
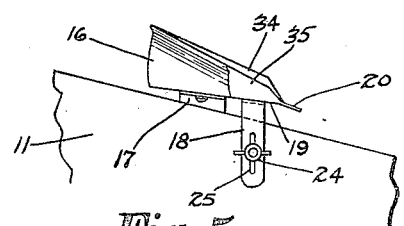
Figure 5 is a detail showing the means for adjustably supporting the opposite end of the spreader.

My grain feeding spreader, designated as a whole by reference numeral 16, is supported upon the walls of the shoe 11, preferably by means of brackets 17 and 18, as illustrated in Figures 4 and 5. The grain feeding spreader 16 is preferably formed of metal, and is in the form of a trough lacking one side wall and narrower at one end than at the other. In other words it consists of a substantially smooth and level plate 19 having a diagonally extending rear wall 21, and a straight front delivery edge 20 over which the grain is fed, as hereinafter described, and suitable end walls 34 and 36. The bracket 17 which supports the receiving end of the spreader is adjustably connected by a thumb screw 23 to the walls of the shoe 11 (see Figure 4), while the bracket 18, which supports the opposite end of the spreader, is adjustably connected to said shoe by a thumb screw 24, which passes through a slot 25 in the bracket. This slot permits a vertical adjustment of this end of the spreader.

The two screws, securing the brackets to the shoe 11, serve as pivots permitting the spreader to be adjusted, or tilted, by having its front edge lowered or raised as may be desired.

As this spreader is secured to the shoe 11 it partakes of the oscillatory movements of said shoe and these movements aid in the uniform feeding of the material over the straight front edge 20 of the spreader.

The grain to be distributed is fed from the spout 15 onto the plate 19 of the spreader substantially at the upper rear corner thereof. The spreader is tilted slightly downward longitudinally, or from its wide or receiving end towards its narrow end. It is also tilted slightly laterally, or from its rear wall 21 towards its discharge edge 20, and the grain, as it travels across the machine, is forced by the diagonal rear wall 21 of the spreader towards the front or discharge edge 20 thereof. As a result the grain feeds off from the edge 20 of the spreader in an even sheet throughout its full length, or the width of the machine.

I may permit the grain to drop directly from the edge 20 of the spreader onto one of the sieves of the shoe, but I prefer to provide means that will bring the grain smoothly onto the sieve without any tendency to bounce or scatter thereon. For this purpose I provide below the discharge edge of the spreader, and supported by the shoe 11, a transverse trough 26 preferably of V-shape and having a longitudinally extending discharge slot 27. I also prefer to provide an inclined directing plate 28 extending downwardly from the slot 27 in the trough 26 and provided with an upward bulge or riffle 29, near its lower end and quite close to the upper surface of the screen 30, upon which the grain from the spreader and trough is deposited.

As here shown the sieve 30 is above the other sieves of the shoe and is a special sieve for handling this repeat material. I may, however, discharge the repeat material from the trough 26 directly onto the top sieve of the shoe in which case the sieve 30 may be omitted.

I have also shown, arranged beyond the sieve 30 and above the lower end of the sieve that is uppermost near the discharge end of the shoe, a sheet metal receiving plate 31 having a deflecting ledge 32 by means of which the material passing over the tail of the sieve 30 is divided and conducted to the sides of the shoe from which points it may be led into any suitable discharge device.

I make no claim herein to the construction of the separator shown and described as the same is claimed in my application hereinbefore referred to, nor do I limit myself to the use of my improved spreader with this particular construction of separator.

I claim as my invention:

1. A spreader and feeder comprising in combination a plate having a front feeding edge, a diagonally arranged rear wall and means for supporting said plate, and permitting adjustment thereof both longitudinally and laterally, for the purpose set forth.

2. A spreader and feeder for grain separators comprising, in combination, a plate having a front feeding edge, a diagonally extending rear wall, means for supporting said plate and permitting vertical adjustment thereof, both longitudinally and laterally, and means for feeding grain or material to be separated onto said plate substantially at its highest rear corner, for the purpose set forth.

3. The combination, with a grain separator shoe and a sieve mounted therein, of a feeder and spreader arranged above said sieve and comprising a plate extending across said shoe and having a feeding edge, a diagonally extending rear wall, means for raising and lowering the narrow end of said plate, means for raising and lowering the feeding edge of said plate, and means for feeding grain onto said plate at the wide end thereof.

In witness whereof, I have hereunto set my hand this 16" day of November 1921.

RICHARD L. OWENS.